(12) United States Patent
El Malek et al.

(10) Patent No.: US 10,349,118 B2
(45) Date of Patent: Jul. 9, 2019

(54) TRANSMISSION ARRANGEMENT FOR WIRELESSLY TRANSMITTING AN MPEG2-TS-COMPATIBLE DATA STREAM

(71) Applicant: INSTITUT FUR RUNDFUNKTECHNIK GMBH, Munich (DE)

(72) Inventors: Ahmad El Malek, Munich (DE); Hermann Lipfert, Munich (DE); Swen Petersen, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 0 days.

(21) Appl. No.: 14/760,534

(22) PCT Filed: Jan. 15, 2014

(86) PCT No.: PCT/EP2014/050672
§ 371 (c)(1),
(2) Date: Jul. 13, 2015

(87) PCT Pub. No.: WO2014/111704
PCT Pub. Date: Jul. 24, 2014

(65) Prior Publication Data
US 2015/0358676 A1     Dec. 10, 2015

(30) Foreign Application Priority Data

Jan. 15, 2013 (IT) .............................. TO2013A0035

(51) Int. Cl.
*H04N 21/2225* (2011.01)
*H04N 21/233* (2011.01)
(Continued)

(52) U.S. Cl.
CPC ..... *H04N 21/4344* (2013.01); *H04N 21/4367* (2013.01); *H04N 21/43637* (2013.01)

(58) Field of Classification Search
CPC ........... H04N 21/2225; H04N 21/2335; H04N 21/234309
(Continued)

(56) References Cited

U.S. PATENT DOCUMENTS

2003/0221100 A1   11/2003   Russ et al.
2004/0252562 A1   12/2004   Kim
(Continued)

FOREIGN PATENT DOCUMENTS

DE   10 2010 003 034 A1   2/2012

OTHER PUBLICATIONS

Wi-Fi Certified Miracast™: Extending the Wi-Fi Experience to Seamless Video Display, XP-002700078, Sep. 19, 2012, pp. 12.
(Continued)

*Primary Examiner* — Dominic D Saltarelli
(74) *Attorney, Agent, or Firm* — Workman Nydegger (57) ABSTRACT

A transmission arrangement for wireless transmission of an MPEG2-TS (Transport Stream) compatible datastream is provided with a signal source for supplying the MPEG2-TS compatible datastream, and an arrangement for wirelessly transmitting the MPEG2-TS compatible datastream. The signal source includes an arrangement for receiving an MPEG2-TS compatible datastream, which datastream includes a plurality of video- and/or audio information signals, and is further provided with a selection arrangement which is adapted to (i) derive only one video- and/or audio information signal from the MPEG2-TS compatible datastream having the plurality of video- and/or audio information signals, (ii) generate an MPEG2-TS compatible datastream which includes this only one video- and/or audio information signal, and (iii) supply this datastream as MPEG2 TS compatible output datastream to an output of the signal source. The transmission arrangement is capable of transmitting a video- and/or audio information signal available in the form of an MPEG2-TS compatible datastream.

6 Claims, 5 Drawing Sheets

(51) Int. Cl.
  *H04N 21/234* (2011.01)
  *H04N 21/434* (2011.01)
  *H04N 21/4363* (2011.01)
  *H04N 21/4367* (2011.01)

(58) Field of Classification Search
  USPC .......................................................... 725/81
  See application file for complete search history.

(56) References Cited

U.S. PATENT DOCUMENTS

| | | | |
|---|---|---|---|
| 2005/0073964 A1* | 4/2005 | Schmidt | H04L 29/06027 370/260 |
| 2008/0261514 A1 | 10/2008 | Pratt et al. | |
| 2008/0295141 A1* | 11/2008 | Dong | H04N 5/4401 725/110 |
| 2011/0197229 A1 | 8/2011 | Yassa | |
| 2013/0258054 A1* | 10/2013 | Park | H04N 21/2362 348/43 |

OTHER PUBLICATIONS

International Search Report and Written Opinion dated May 12, 2014, issued in PCT Application No. PCT/EP2014/050672, filed Jan. 15, 2014.

"Wi-Fi Display Technical Specification: Version 1.1" Wi-Fi Alliance, 2012.

\* cited by examiner

FIG. 5

TRANSMISSION ARRANGEMENT FOR WIRELESSLY TRANSMITTING AN MPEG2-TS-COMPATIBLE DATA STREAM

INTRODUCTION

The invention relates to a transmission arrangement in accordance with the preamble of claim 1 as well as to a signal source which can be applied in this type of transmission arrangement. A transmission arrangement in accordance with the preamble of claim 1 is known from the Wi-Fi Display technical specification version 1.0.0 of the Wi-Fi Alliance. This technical specification describes a wireless transmission system in accordance with the Miracast standard.

In the known transmission arrangement, a video and/or audio information signal is encoded to a Miracast compatible data stream which is transmitted wirelessly. For this purpose, a video and/or audio information signal is packed in an MPEG2-TS compatible data stream after the video or audio encoding, once this MPEG2-TS compatible data has been transformed into a Miracast compatible data stream, which can be transmitted wirelessly to a receiver, e.g., a Miracast compatible television receiver.

DESCRIPTION OF THE INVENTION

The object of the invention is to provide an improved transmission arrangement as recited in the claims. All the attached claims are considered as an integral part of the present description.

The invention's underlying object is to propose a transmission arrangement which is capable of wirelessly transmitting a video and/or audio information signal, already present in the form of an MPEG2-TS compatible data stream, to a receiver.

The number of mobile computing devices applied at home is constantly growing. For this reason, home entertainment is becoming increasingly important. Users increasingly wish to connect audio and video sources such as smart phones, MP3 players, and cameras, with television receivers or hi-fi systems. These, however, are not the only possible sources. In the future, different means of supply, e.g., DVB-T2 receivers, will be used to directly and wirelessly transmit the programs received in this way to one or more high-resolution screens or sound systems at home for visual and acoustic playback.

The transmission method referred to as Miracast, which has been introduced recently, might assist in this matter without being limited to it. This transmission method, however, is rather inflexible because only un-encoded video and/or audio signals are accepted.

According to the invention, the data streams already compatible with MPEG2-TS are enabled to transmit the present information signals wirelessly without being transcoded.

It should be mentioned that receivers that are currently available, e.g., DVB receivers, also contain an arrangement for receiving MPEG2-TS compatible data streams containing several video and/or audio information signals as well as a selection arrangement incorporated for channeling off an individual video and/or audio information signal from the MPEG2-TS compatible data stream containing several video and/or audio information signals. In these known DVB receivers, however, this individual video and/or audio information signal is decoded in order to obtain a video and/or audio information signal that can then be supplied directly to a television receiver. An MPEG2-TS compatible data stream only contains this individual video and/or audio information signal. Thus, it is not generated in any known DVB receiver.

It should also be mentioned that DE-102010033034A1 describes a transmission arrangement which is also capable of receiving an encoded digital video and/or audio information signal and wirelessly transmitting it to a receiver. In order to do so, however, this encoded signal has to be transcoded into a suitable format first, in order to enable a wireless connection. This is contrary to the transmission arrangement according to the invention in which this type of transcoding is not necessary for the wireless transmission.

BRIEF DESCRIPTION OF THE ILLUSTRATION

The invention is described in detail with reference to several embodiments in the following figure description. Therein.

DESCRIPTION OF THE FIGURES

Figure 1:
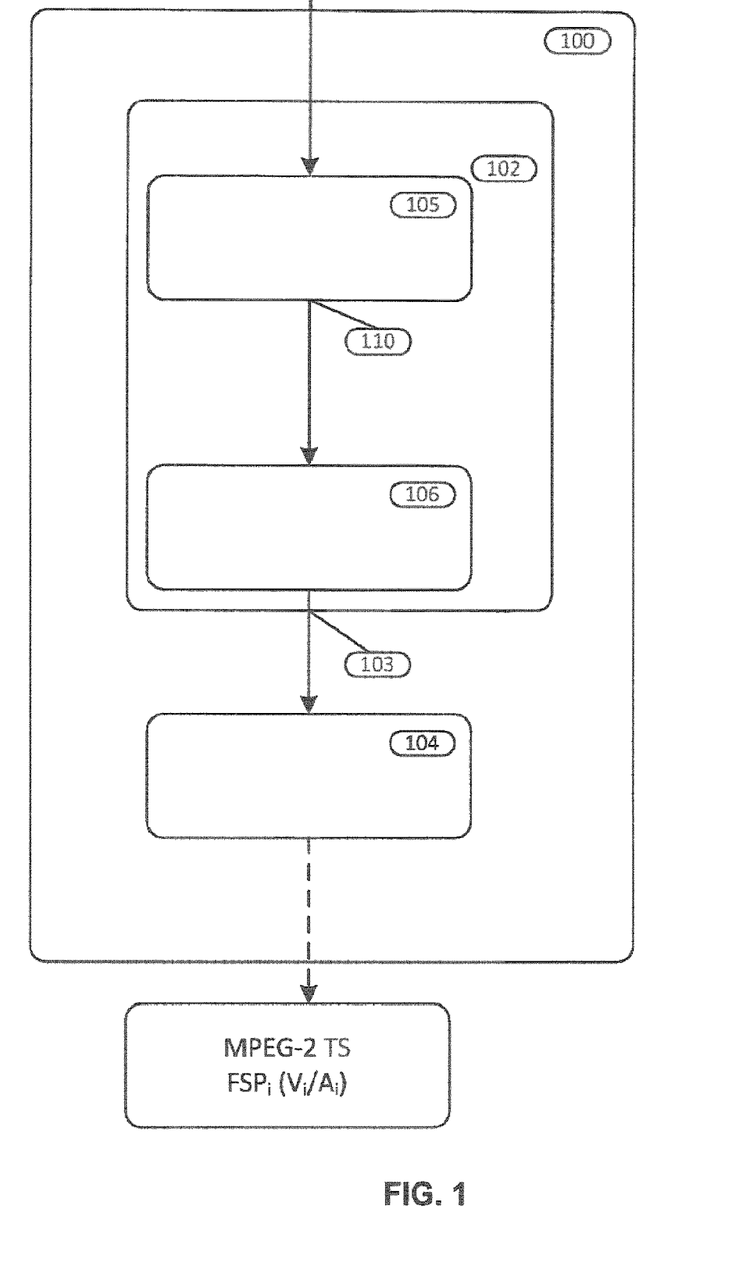
FIG. 1 shows an embodiment of the transmission arrangement in accordance with the invention.

FIG. 1 schematically shows an embodiment 100 of the transmission arrangement. The transmission arrangement contains a signal source 102 for supplying an MPEG2-TS compatible data stream at an output 103. The transmission arrangement 100 also contains a arrangement 104 for the wireless transmission of the MPEG2-TS compatible data stream to a receiver, which is not shown. The signal source 102 contains an arrangement 105 for receiving an MPEG2-TS compatible data stream containing several video and/or audio information signals as well as a selection arrangement 106. The selection arrangement 106 is adapted i. for deriving only a single video and/or audio information signal from the MPEG2-TS compatible data stream with several video and/or audio information signals at the output of the arrangements 105, ii. for generating an MPEG2-TS compatible data stream containing only this single video and/or audio information signal, and iii. for supplying this data stream to the output 103 as an MPEG2-TS compatible output data stream of the signal source The source 102 can, for example, be a DVB receiver which is capable of channeling off an MPEG2-TS compatible data stream containing several video and/or audio information signals from the received DVB signal in a known way by means of the arrangement 105.

The composition of such an MPEG2-TS compatible data stream containing several video and/or audio information signals is shown in FIG. 2a. The MPEG2-TS compatible data stream containing only this individual video and/or audio information signal is shown in FIG. 2a.

The arrangement 105 is thus, as stated above, capable of receiving an MPEG2-TS compatible data stream containing several video and/or audio information signals and supplying it to an output terminal 110. This arrangement 105 can, for example, be the generally known receiving apparatus of a DVB receiver. The composition of the serial data stream at the output terminal 110 will subsequently be shown in FIG. 2, in particular, with reference to FIG. 2d. This serial data stream contains several video and/or audio information signals. In an DVB receiver, these are several (n) television programs, $FSP_1$, $FSP_2$, $FSP_3$, . . . , $FSP_n$, each of these television programs $FSP_i$ being assigned a video information signal $V_i$ and a respective audio information signal $A_i$ as an example.

As stated above, the selection arrangement 106 derives only a single video and/or audio information signal from the MPEG2-TS compatible data stream at the output terminal 110, which is an MPEG2-TS compatible data stream containing several video and/or audio information signals.

Figure 2:
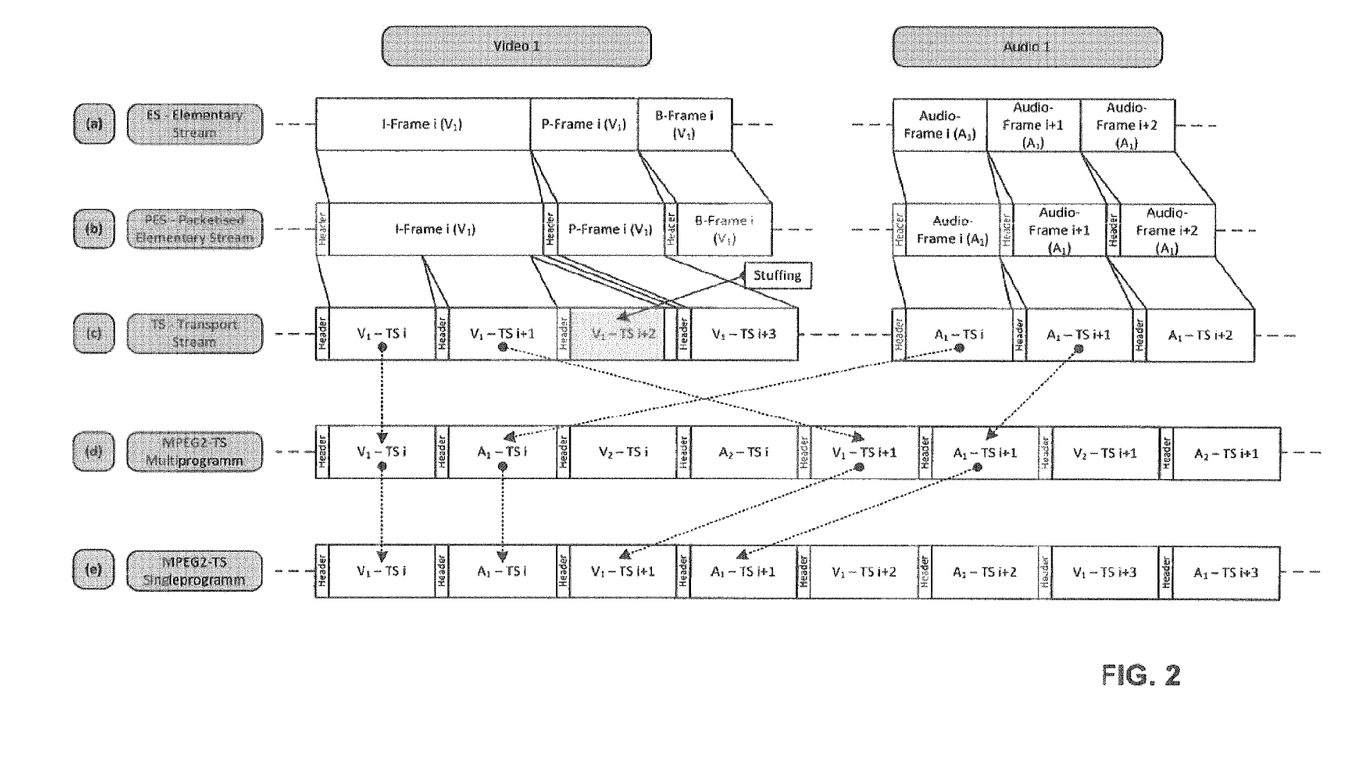
FIG. 2 shows several data streams within the transmission arrangement of FIG. 1.

In other words, the selection arrangement 106 derives only a single television program $FSP_i$ from several television programs $FSP_n$ and supplies this television program to the output terminal 103 in the form of an MPEG2-TS compatible data stream containing only this single video and/or audio information signal ($V_i$ and $A_i$). FIG. 2 also shows the composition of this MPEG2-TS compatible data stream containing only this single video and/or audio information signal. This data stream is shown in detail in FIG. 2e.

As stated above, the arrangement 104 is adapted for wirelessly transmitting the MPEG2-TS compatible data stream to a receiver, which is not shown. This arrangement 104 is a generally known arrangement as it is, for example, used in the Wi-Fi Display technical specification, version 1.0.0 of the Wi-Fi Alliance or as already described in DE-102010033034A1.

FIG. 2 schematically shows the composition of an MPEG2-TS compatible data stream containing several video and/or audio information signals ($V_n$ and $A_n$). In this embodiment, the data stream contains two video and/or audio information signals $V_1$, $A_1$ and $V_2$ and $A_2$ (n=2). FIGS. 2a, 2b and 2c show how a video information signal $V_1$ and a respective audio information signal $A_1$ are incorporated into a serial data stream. In an elementary stream plane ES, see FIG. 2a, there is the video information signal coded in I-frames (=intraframe-coded packets or frames), P-frames (=packets or frames unidirectionally interframe-coded) and B-frames (=packets or frames bidirectionally interframe-coded). The audio information signal $A_1$ is present in audio signal blocks (or frames).

FIG. 2b shows the video information signal $V_1$ and the respective audio information signal $A_1$ in a packed elementary stream plane PES. This data stream is generated by adding signal block headers to the signal blocks of the video and audio information signal.

FIG. 2c shows the conversion of the video information signal $V_1$ and the respective audio information signal $A_1$ of FIG. 2b into a transport stream TS. Here, it is evident that in this exemplary embodiment, the content of the I-frame $i(V_1)$ is too large in order to be incorporated into one frame of the transport stream shown in FIG. 2c. Accordingly, the content of I-frame $i(V_1)$ is stored in three successive frames of the transport stream TS instead, the third frame ($V_1$–TS i+2) being partly filled with stuffing bits. This distribution can be necessary for all frames (I, P, B, and audio), depending on the applied codec, and varies from case to case.

FIG. 2d shows the composition of an MPEG2-TS compatible transport stream, which contains the video information signal $V_1$ and the respective audio information signal $A_1$ as well as the video information signal $V_2$ and the respective audio information signal $A_2$. It is apparent how the frames of the video information signal $V_1$ and the respective audio information signal $A_1$ are incorporated into the MPEG2-TS compatible data stream, alternating with frames of the video information signal $V_2$ ($V_2$–TS i, $V_2$–TS i+1, . . . ) and of the respective audio information signal $A_1$ ($A_2$–TS i, $A_1$–TSi+1, . . . ).

This data stream thus forms the output signal at the output 110 of the arrangement 105.

FIG. 2e shows the output signal of the selection arrangement 106 and shows the MPEG2-TS compatible data stream that contains only the single video and/or audio information signal ($V_1$, $A_1$). Only the frames of the video information signal $V_1$ and the respective audio information signal $A_1$ in the data stream of FIG. 2d are filtered therefrom to form a new MPEG2-TS compatible data stream in accordance with FIG. 2e which contains only the frames of the video information signal $V_1$ and/or the audio information signal $A_1$.

The invention is further described with reference to FIG. 3. Here, the signal source of the transmission arrangement 300 is indicated by the frame 302. The arrangement for the wireless transmission of the transmission arrangement 300 is indicated by the block 304.

As already stated above, an MPEG2-TS compatible data stream with several video and/or audio information signals is supplied to the signal source 302. This MPEG2-TS compatible data stream having several video and/or audio information signals can be contained in and derived from different types of data streams (which is already known and not part of the invention).

The different types of data streams are, for example, contained in media files compatible with the standards DVB-T, DVB-T2, DVB-S, DVB-S2, DVB-C, DAB, DAB+, DMB, LTE, UMTS, GSM, or MPEG2-TS.

The block 312 is to be understood as follows. Either the block 312 contains an arrangement for the extraction of the MPEG2-TS compatible data stream with one or more video and/or audio information signals from one of the above-mentioned standard-compatible data streams or the block 312 is to be understood simply as an input terminal that receives the extracted MPEG2-TS compatible data stream with one or more video and/or audio information signals.

In block 314, in case that an MPEG2-TS compatible data stream with several video and/or audio information signals is received from one of the above-mentioned standard-compatible data streams, as it is shown in FIG. 2d, only an individual audio and/or information signal ($V_i$, $A_i$) is derived, as it is already described above. This way of proceeding is to be construed as re-multiplexing.

It speaks for itself that, if already an MPEG2-TS compatible data stream that contains only a single video and/or audio information signal is received, the block 314 is skipped (see the dashed line 315).

In block 316, a generally known HDCP (high-bandwidth digital content protection) method is applied to the single video and/or audio information signal. The block 318, in turn, converts this single (data-protected) video and/or audio information signal ($V_i$, $A_i$) into an MPEG2-TS compatible data stream that can be transmitted wirelessly.

In the block 320, an embedding is carried out, wherein the MPEG2-TS compatible data stream containing only this single video and/or audio information signal is converted into an RPT (real time protocol) payload stream. Afterwards, the RPT payload stream is embedded into a UDP (universal datagram protocol) data stream in block 322. The UDP data stream is afterwards embedded into an IP (internet protocol) data stream in block 324. In block 326, the IP data stream is embedded, in packets, into a WLAN data stream according to the standard IEEE 802.11 for the wireless transmission to a receiver (not shown). This WLAN data stream is described in the Wi-Fi peer-to-peer (P2P) technical specification version 1.1 of the Wi-Fi Alliance.

Figure 4:
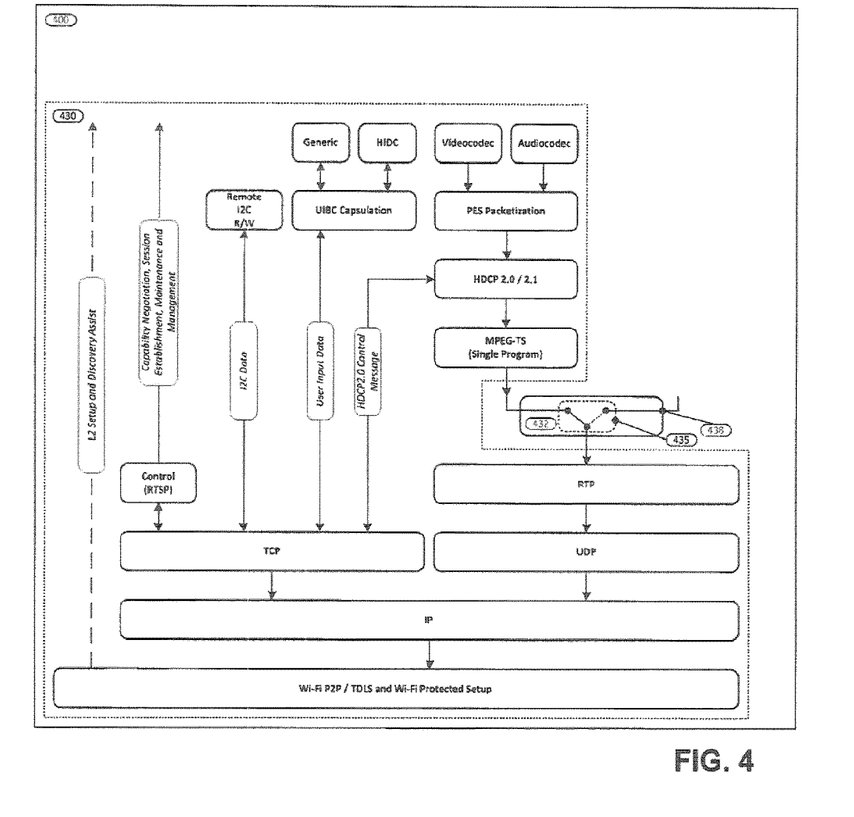
FIG. 4 shows a third embodiment of a different transmission arrangement.

FIG. 4 shows a different embodiment of the transmission arrangement 400 in accordance with the invention. Block 430, encircled with a dashed line, is a wireless transmission arrangement known from the Wi-Fi Display technical specification version 1.0.0 of the Wi-Fi Alliance (of the Miracast specification) which will be further referred to as Miracast transmission arrangement.

For a detailed description of the Miracast transmission arrangement, it is therefore referred to this Wi-Fi Display technical specification. The transmission arrangement shown in FIG. 4, however, is additionally equipped with an input arrangement 432 for the direct reception of an MPEG2-TS compatible data stream containing only a single video and/or audio information signal, prior to wirelessly transmitting. As it is shown in FIG. 4, this MPEG2-TS compatible data stream containing only a single video and/or information signal is directly supplied to the transmission arrangement 400 in the RTP plane. According to a hardware solution, this is achieved in that the input arrangement 432 contains a switch arrangement 435 that is arranged in the position as shown (switch facing the left hand side). Then, the transmission arrangement operates as a conventional Miracast transmission system. If the switch 435 is arranged in the position as indicated by dashes (switch facing the right hand side), a compatible data stream, already present in the form of an MPEG2-TS data stream that contains only a single video and/or audio information signal can directly be obtained at the input terminal 438 of the input arrangement432 and wirelessly transmitted by means of the transmission system 430.

Therefore the switching arrangement (435) is adapted for switching between an internal MPEG2-TS compatible datastream, which comprises only one video- and/or audio information signal, and said external MPEG2-TS compatible datastream, which comprises only one video- and/or audio information signal.

It speaks for itself that the input arrangement 432 can also be embodied as a software solution.

Figure 5:
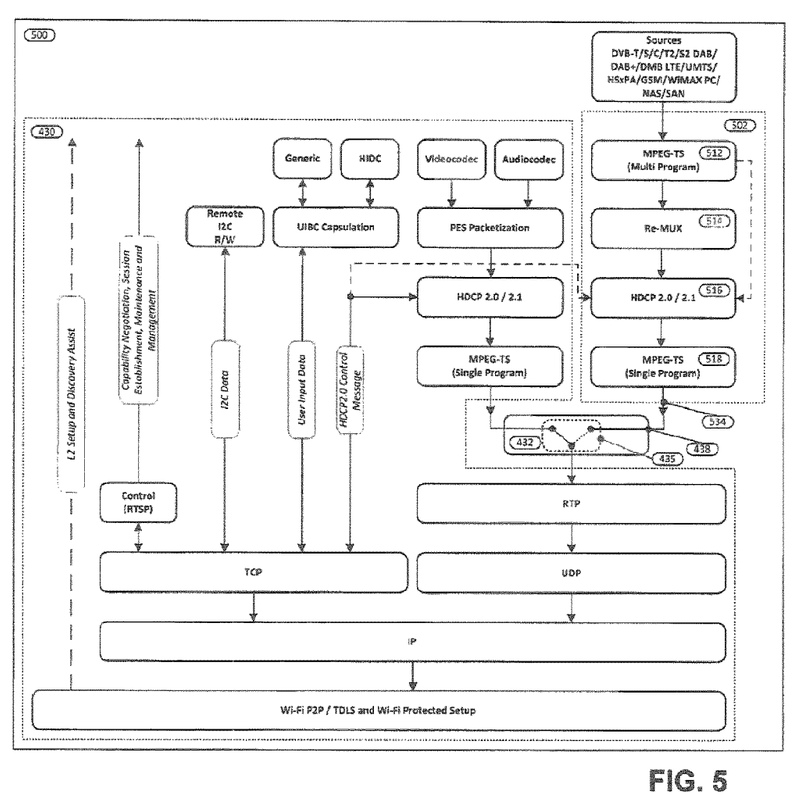
FIG. 5 shows a fourth embodiment of the transmission arrangement.

FIG. 5, in turn, shows a different embodiment of the transmission arrangement 500 in accordance with the invention. This embodiment additionally contains the signal source 502. This signal source 502 supplies the MPEG2-TS compatible data stream, which only contains this single video and/or audio information signal, to the Miracast transmission system 430 via the input arrangement 432. For this purpose, an output 534 of the signal source 502 is then linked to the input terminal 438 of the input arrangement 432.

The switching means (432) supplies at the output the MPEG2-TS compatible datastream, which comprises this only one video- and/or audio information signal, to an RTP (Real Time Protocol) processing unit for converting the MPEG2-TS compatible datastream which comprises this only one video- and/or audio information signal into an RTP datastream.

Figure 3:
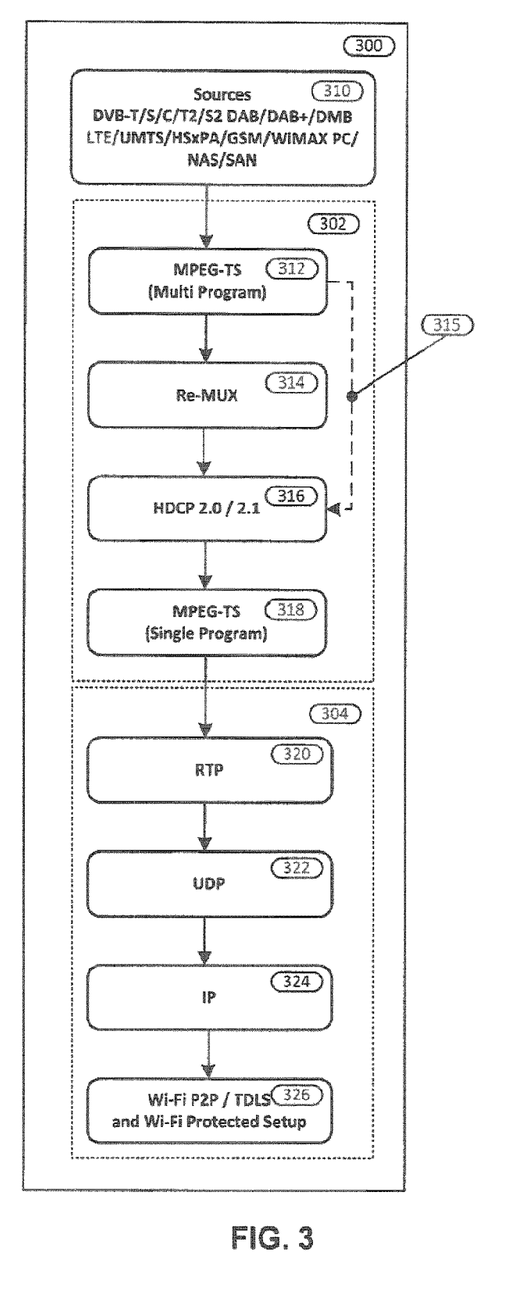
FIG. 3 shows a second embodiment of the transmission arrangement.

The signal source 502 can be assembled as the signal source 302 in FIG. 3. The blocks 512, 514, 516, and 518 then work in the same way as the corresponding frames 312, 314, 316, and 318 already described in FIG. 3.

The invention claimed is:

1. A transmission arrangement for wireless transmission of an MPEG2-TS (Transport Stream) compatible datastream, the transmission arrangement comprising:

a first signal source for supplying a first MPEG2-TS compatible datastream transcoded, according to the WiFi Display Technical Specification of the WiFi Alliance, wherein the first MPEG2-TS compatible datastream provided by the first signal source includes only one video and/or audio information signal;

an input arrangement including a first input connected to an output of the first signal source for receiving the first MPEG2-TS compatible datastream and including a second input connected to an output of a second signal source for directly receiving an external MPEG2-TS compatible datastream; and wherein the second signal source is devoid of a transcoding arrangement for supplying the external MPEG2-TS compatible data stream to the input arrangement, wherein the second signal source for supplying the external MPEG2-TS compatible datastream comprises:

an arrangement for receiving a second MPEG2-TS compatible datastream, wherein the second MPEG2-TS compatible datastream comprises a plurality of video and/or audio information signals, a selection arrangement that is configured to, without transcoding the second MPEG2-TS compatible datastream:
i) derive only one video and/or audio information signal from the second MPEG2-TS compatible datastream by adding signal block headers to signal blocks of the second MPEG-2-TS compatible datastream to create a packed data stream, converting the packed data stream into a transport stream and remultiplexing the transport stream,
ii) generate the external MPEG2-TS compatible datastream which comprises the only one video and/or audio information signal from the transport stream, and
iii) supply the external MPEG2-TS compatible datastream to the output of the second signal source such that the external MPEG2-TS compatible datastream is received at the second input of the input arrangement, an arrangement for wirelessly transmitting, wherein the arrangement for wirelessly transmitting comprises a transmission stage of the WiFi Display Technical Specification of the WiFi Alliance, the transmission stage comprising an input for receiving the external MPEG2-TS compatible data stream which comprises the only one video and/or audio information signal, the transmission stage further configured to:
i) convert the external MPEG2-TS compatible datastream into a WiFi Display Technical Specification compatible datastream of the WiFi Alliance, and
ii) wirelessly transmit the WiFi Display Technical Specification compatible datastream to a receiver, wherein said input arrangement comprises a switching means for switching between said first MPEG2-TS compatible datastream and said external MPEG2-TS compatible datastream.

2. The transmission arrangement as claimed in claim 1, wherein the selection arrangement comprises a remultiplexer arrangement which is adapted to convert the second MPEG2-TS compatible datastream into the external MPEG2-TS compatible datastream which comprises the only one video and/or audio information signal.

3. The transmission arrangement as claimed in claim 1, wherein an input of the transmission stage is configured to directly receive the external MPEG2-TS compatible datastream prior to wirelessly transmitting.

4. The transmission arrangement as claimed in claim 1, wherein the switching means includes an output for supplying the first MPEG2-TS compatible datastream or the external MPEG2-TS compatible datastream to an RTP (Real Time Protocol) processing unit for converting the first MPEG2-TS compatible datastream or the external MPEG2-TS compatible datastream into an RTP datastream.

5. The transmission arrangement as claimed in claim 1, wherein the WiFi Display Technical Specification compatible datastream of the WiFi Alliance is the Version 1.0.0 (Miracast).

6. A transmission arrangement for wireless transmission of an MPEG2-TS (Transport Stream) compatible datastream, the transmission arrangement comprising:
   a first signal source for supplying a first MPEG2-TS compatible datastream according to the WiFi Display Technical Specification of the WiFi Alliance;
   a second signal source devoid of a transcoding arrangement for supplying an external MPEG2-TS compatible datastream, wherein the external MPEG2-TS compatible datastream is supplied and wirelessly transmitted without being transcoded;
   an input arrangement including a first input connected to an output of the first signal source for receiving the first MPEG2-TS compatible datastream and including a second input connected to an output of the second signal source for directly receiving the external MPEG2-TS compatible datastream wherein the input arrangement includes an output,
   a switching means for switching between the first MPEG2-TS compatible datastream and the external MPEG2-TS compatible datastream,
   wherein the second signal source for supplying the external MPEG2-TS compatible datastream comprises:
   an arrangement for receiving a second MPEG2-TS compatible datastream, wherein the second MPEG2-TS compatible datastream comprises a plurality of video and/or audio information signals, and
   a selection arrangement that is configured to, without transcoding the second MPEG2-TS compatible datastream:
      i) derive only one video and/or audio information signal from the second MPEG2-TS compatible datastream by adding signal block headers to signal blocks of the second MPEG2-TS compatible datastream to create a packed data stream, converting the packed data stream into a transport stream and remultiplexing the transport stream,
      ii) generate the external MPEG2-TS compatible datastream from the transport stream, wherein the external MPEG2-TS compatible datastream only includes one video and/or audio information signal, and
      iii) supply the external MPEG2-TS compatible datastream to the output of the second signal source,
   an arrangement for wireless transmission connected to the output of the input arrangement, wherein the arrangement for wireless transmission receives an output MPEG2-TS compatible datastream, wherein the output MPEG2-TS compatible datastream is one of the first MPEG2-TS compatible datastream or the external MPEG-2 compatible datastream, wherein the arrangement for wireless transmission is configured to:
      convert the output MPEG2-TS compatible datastream into a WiFi Display Technical Specification compatible datastream of the WiFi Alliance, and
      wirelessly transmit the WiFi Display Technical Specification compatible datastream to a receiver.

\* \* \* \* \*